United States Patent
Friedman et al.

(10) Patent No.: US 9,218,211 B2
(45) Date of Patent: Dec. 22, 2015

(54) PRIORITY PROMOTION FOR SERVICE REQUESTS

(75) Inventors: Jacob W. Friedman, Poughkeepsie, NY (US); Bernard Pierce, Poughkeepsie, NY (US); Peter J. Relson, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1858 days.

(21) Appl. No.: 12/348,075

(22) Filed: Jan. 2, 2009

(65) Prior Publication Data

US 2010/0174873 A1 Jul. 8, 2010

(51) Int. Cl.
- G06F 12/00 (2006.01)
- G06F 13/00 (2006.01)
- G06F 9/50 (2006.01)
- G06F 12/08 (2006.01)

(52) U.S. Cl.
CPC .............. *G06F 9/5038* (2013.01); *G06F 12/08* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 5,155,858 A * | 10/1992 | DeBruler et al. | 718/105 |
| 5,261,045 A | 11/1993 | Scully et al. | |
| 5,600,837 A * | 2/1997 | Artieri | 718/103 |
| 5,903,845 A | 5/1999 | Buhrmann et al. | |
| 5,937,205 A * | 8/1999 | Mattson et al. | 710/6 |
| 6,457,062 B1 | 9/2002 | Pivowar et al. | |
| 6,604,079 B1 | 8/2003 | Ruvolo et al. | |
| 6,728,792 B2 * | 4/2004 | Wagner | 710/6 |
| 6,874,144 B1 * | 3/2005 | Kush | 718/103 |
| 7,051,330 B1 * | 5/2006 | Kaler et al. | 718/106 |
| 7,181,689 B2 | 2/2007 | Mock et al. | |
| 7,206,922 B1 * | 4/2007 | Steiss | 712/216 |
| 7,650,601 B2 * | 1/2010 | Aguilar et al. | 718/104 |
| 7,664,905 B2 * | 2/2010 | Jarosh et al. | 711/5 |
| 7,690,003 B2 * | 3/2010 | Fuller | 719/321 |
| 7,802,255 B2 * | 9/2010 | Pilkington | 718/102 |
| 2002/0065867 A1 * | 5/2002 | Chauvel | 709/104 |
| 2004/0039884 A1 * | 2/2004 | Li | 711/156 |

(Continued)

FOREIGN PATENT DOCUMENTS

EP          1217532 A2     6/2002

OTHER PUBLICATIONS

U.S. Appl. No. 12/348,071; Final Office Action; dated Oct. 24, 2011.

(Continued)

*Primary Examiner* — Charles Rones
*Assistant Examiner* — Matthew Chrzanowski
(74) *Attorney, Agent, or Firm* — Cantor Colburn LLP; William A. Kinnaman, Jr.

(57) ABSTRACT

A method for priority promotion of a service request comprises receiving the service request for a target address space into a set of work requests, the set of work requests comprising a plurality of service requests for the target address space, the service request originating from a source address space, the service request having a priority equivalent to a priority of the target address space, the source address space having a higher priority than the target address space; determining a number of service requests for the target address space in the set of work requests; and, in the event the number of service requests for the target address space exceeds a predetermined value, promoting the priority of the service request to the priority of the source address space.

6 Claims, 4 Drawing Sheets

(56) References Cited

U.S. PATENT DOCUMENTS

| | | | |
|---|---|---|---|
| 2004/0162941 A1* | 8/2004 | Aigo | 711/114 |
| 2004/0268270 A1 | 12/2004 | Hill et al. | |
| 2005/0149936 A1* | 7/2005 | Pilkington | 718/102 |
| 2006/0099945 A1 | 5/2006 | Helvick | |
| 2006/0117316 A1* | 6/2006 | Cismas et al. | 718/103 |
| 2006/0294522 A1* | 12/2006 | Havens | 718/103 |
| 2007/0016646 A1 | 1/2007 | Tendjoukian et al. | |
| 2008/0027955 A1 | 1/2008 | May et al. | |
| 2008/0307323 A1 | 12/2008 | Coffman et al. | |

OTHER PUBLICATIONS

U.S. Appl. No. 12/348,071; Non-Final Office Action; dated Aug. 1, 2011.

* cited by examiner

100

NEW SERVICE REQUEST FOR TARGET ADDRESS SPACE GENERATED BY SOURCE
WORK
101

SEARCH SET OF PENDING WORK REQUESTS TO DETERMINE INSERTION POINT FOR
NEW SERVICE REQUEST
102

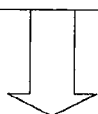

DETERMINE NUMBER OF PENDING SERVICE REQUESTS FOR THE TARGET ADDRESS
SPACE IN THE SET OF PENDING WORK REQUESTS
103

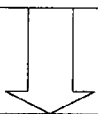

IF NUMBER OF PENDING SERVICE REQUESTS FOR THE TARGET ADDRESS SPACE
EXCEEDS PREDETERMINED VALUE, TRIGGER PROMOTION FOR TARGET ADDRESS
SPACE
104

```
┌─────────────────────────────────────────────────────────────────────┐
│  DETERMINE WHETHER NUMBER N OF SERVICE REQUESTS TO PROMOTE IS POSITIVE │
│                              201                                    │
└─────────────────────────────────────────────────────────────────────┘
                                 ⇓
┌─────────────────────────────────────────────────────────────────────┐
│    IF NUMBER OF SERVICE REQUESTS TO PROMOTE IS POSITIVE, PROMOTE NEW │
│     SERVICE REQUEST AND ASSOCIATED WORK TO PRIORITY OF SOURCE WORK   │
│                              202                                    │
└─────────────────────────────────────────────────────────────────────┘
                                 ⇓
┌─────────────────────────────────────────────────────────────────────┐
│    PROMOTE N-1 ADDITIONAL SERVICE REQUESTS FOR THE TARGET ADDRESS SPACE │
│                          AS THEY ARE RECEIVED                       │
│                              203                                    │
└─────────────────────────────────────────────────────────────────────┘
                                 ⇓
┌─────────────────────────────────────────────────────────────────────┐
│      CONTINUE EXECUTION OF PENDING WORK REQUEST IN ORDER OF PRIORITY │
│                              204                                    │
└─────────────────────────────────────────────────────────────────────┘
```

FIG. 2

PRIORITY PROMOTION FOR SERVICE REQUESTS

BACKGROUND

This disclosure relates generally to the field of work scheduling in a mainframe operating system.

A mainframe operating system (OS) such as z/OS (a product of IBM, see http://www-03.ibm.com/systems/z/os/zos/ for more information) provides continuous, high-volume operation with high security and stability. A mainframe OS may be a 64-bit operating system that offers the functionality of modern mainframe operating systems alongside the functionality of older mainframe operating systems, allowing for backward compatibility with the older systems. A mainframe computer system may comprise a single operating system instance, or multiple operating system instances running in parallel.

The mainframe operating system may allow definition of goals and business importance for work. Work may comprise one or more related programs executing within a virtual address space. The mainframe OS may assign different priorities to different virtual address spaces in the system according to the relative importance of the work that belongs to that address space. The workload manager (WLM) of the mainframe operating system may automatically manage the various units of work based on the priority of their respective address spaces. The system processors may execute high importance work first, allocating processor time to lower importance work as the processor time is available.

Work allocated to one address space may, in the course of execution, need to perform an action that is executed in a different address space. The work may request the action be run asynchronously in the different address space. The request to run the associated program asynchronously may comprise a service request, which may be represented by a control block that may be referred to as an SRB (Service Request Block). The service request is a type of work request that allows the operating system to perform additional work, or services, on behalf of requesting work. The additional work associated with the service request may be represented by a control block that may be referred to as a work element block (WEB). A WEB may represent any work in the system, whether or not the work is initiated by a service request.

Service requests provide a mechanism for communication between address spaces. The service request may be addressed, or targeted, to a lower priority address space than the address space of the requesting work. The address space that originates the service request may be referred to as the source address space, and the address space in which the service request executes may be referred to as the target address space. The WLM may have no knowledge of the importance of a service request beyond its target address space, resulting in the work associated with the service request being scheduled for execution at the priority of the target address space. A service request may have global (system-wide) or local (address space-wide) priority. The system places the service request in a set of pending service requests, and the work associated with the service request is pending until the work associated with the service request becomes the highest priority work in the set.

A service request with global priority has a higher priority than that of any other address space, regardless of the priority of the target address space. However, a service request with local priority has a priority equal to that of the target address space. The assignment of global or local priority depends on the importance of the request; for example, a service request for an I/O interrupt may be scheduled at a global priority, to minimize I/O delays.

The target address space may be incapable of executing a local service request if the system processors are busy providing service to higher priority work. A source program may continue execution at its higher priority, and continue to issue local service requests for a lower-priority target address space if issued service requests for the target address space are not executed in a timely fashion. This may result in large numbers of service requests being issued for the target address space. The size of the set of pending service requests for the target address space may become a performance issue. It is also possible that the virtual storage available to the set of pending service requests may be exceeded, possibly resulting in failure of the mainframe system.

BRIEF SUMMARY

An exemplary embodiment of a method for priority promotion of a service request comprises receiving the service request for a target address space into a set of work requests, the set of work requests comprising a plurality of service requests for the target address space, the service request originating from a source address space, the service request having a priority equivalent to a priority of the target address space, the source address space having a higher priority than the target address space; determining a number of service requests for the target address space in the set of work requests; and, in the event the number of service requests for the target address space exceeds a predetermined value, promoting the priority of the service request to the priority of the source address space.

An exemplary embodiment of a computer program product comprises a computer readable storage medium containing computer code that, when executed by a computer, implements a method for priority promotion of a service request, the method comprising receiving the service request for a target address space into a set of work requests, the set of work requests comprising a plurality of service requests for the target address space, the service request originating from a source address space, the service request having a priority equivalent to a priority of the target address space, the source address space having a higher priority than the target address space; determining a number of service requests for the target address space in the set of work requests; and, in the event the number of service requests for the target address space exceeds a predetermined value, promoting the priority of the service request to the priority of the source address space.

An exemplary embodiment of a system for priority promotion of a service request comprises a source address space comprising work executing at a priority of the source address space in the source address space; a target address space, the target address space having a priority lower than the priority of the source address space; a set of work requests, the set of work requests comprising a plurality of service requests for the target address space, the plurality of service requests for the target address space having the priority of the target address space, at least one service request of the plurality of service requests for the target address space being associated with work executing in a source address space; and a promotion module configured to promote the at least one service request associated with the work executing in the source address space to the priority of the source address space in the event that a number of the plurality of service requests for the target address space exceeds a predetermined number.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 1 illustrates an embodiment of a method for a method for triggering promotion of service requests.

FIG. 2 illustrates an embodiment of a method for promotion of service requests.

DETAILED DESCRIPTION

Figure 3:
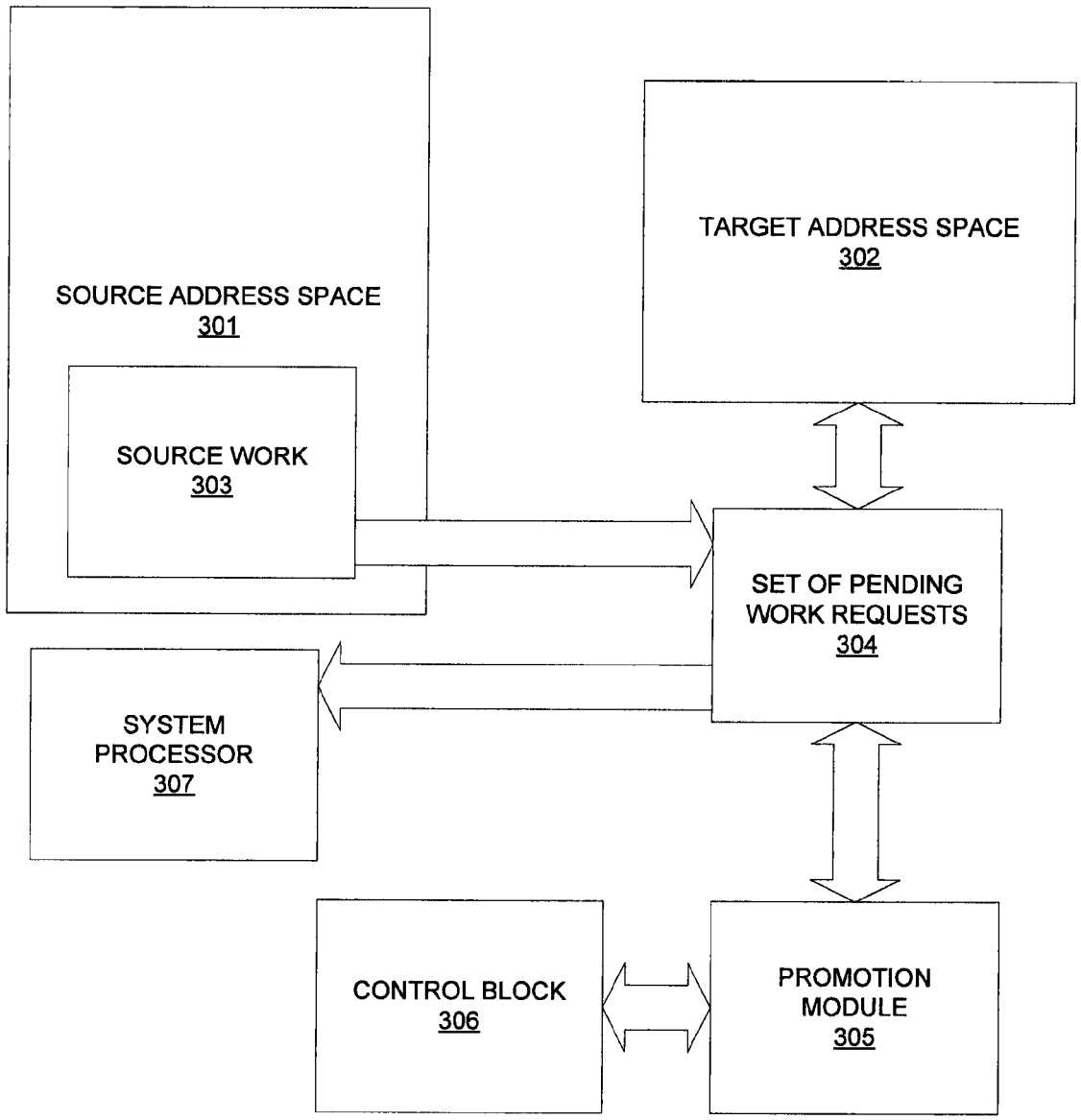
FIG. 3 illustrates an embodiment of a system for priority promotion for a service request.

Embodiments of systems and methods for priority promotion for service requests are provided, with exemplary embodiments being discussed below in detail.

Detection of excessive numbers of pending service requests and associated work for an address space may prevent system failure. If excessive numbers of pending service requests for an address space are detected, the priority of a service request may be promoted from the priority of the target address space to that of the source address space that originated the service request. Promotion may be repeated for successive service requests received for the target address space, preventing the set of pending service requests from becoming sufficiently large to cause system performance problems or system failure.

FIG. 1 illustrates an embodiment of a method 100 for triggering of priority promotion for a service request. In block 101, a new service request is generated for a target address space by source work located in a source address space. In block 102, a set of pending work requests is searched to determine an insertion point for the new service request based on the priority of the new service request and the priority of the target address space. The set of pending work requests may comprise any pending work in the system, including but not limited to service requests. The set of pending work requests may comprise a queue in some embodiments. In block 103, a number of pending service requests for the target address space in the set of pending work requests is determined. In block 104, if the number of pending service requests for the target address space in the set of pending work requests is determined to exceed a predetermined value, the execution rate of service requests is deemed to be insufficient to keep up with demand from source programs, and service request promotion is triggered for the target address space.

FIG. 2 illustrates an embodiment of a method 200 for promotion of service requests. In block 201, it is determined whether a number of service requests to promote, which may be a predetermined value N, is positive, and, if the number of service requests to promote is positive, in block 202, the new service request and associated work are promoted to the priority of the service request's source work. In block 203, promotion is repeated for N−1 additional service requests for the target address space as they are received in the set of pending service requests. The N−1 additional service requests for the target address space are promoted to the priority of their respective source work. In block 204, work associated with the set of pending work requests continues execution in order of priority.

FIG. 3 shows an embodiment of a system 300 for promotion of a service request. System 300 comprises source address space 301 and target address space 302. Source address space 301 has a higher priority than target address space 302. Source work 303 executes in source address space 301, and issues a new service request directed to target address space 302. The new service request is placed in a set of pending work requests 304. Promotion module 305 uses predetermined values that are stored in control block 306 to determine whether promotion of service requests for target address space 203 is triggered by conditions in the set of pending work requests, and, if promotion is triggered, promotion module 305 promotes service requests for target address space 302 in set of pending work requests 304, allowing for execution of the work associated with the promoted service requests for target address space 302, and reducing the size of the set of pending work requests 304. System processor 307 executes work associated with pending work requests in set 304 in order of priority.

Predetermined values stored in control block 306 may include a number pending service requests for the target address space that triggers promotion, and a number of service requests for the target address space to be promoted (N) when promotion is triggered. The size of the set for pending service requests for the target address space at which promotion is triggered may be between approximately 0 and 200 in some embodiments. The number of service requests for the target address space to be promoted when promotion is triggered may be between approximately 0 and 200 in some embodiments.

Figure 4:
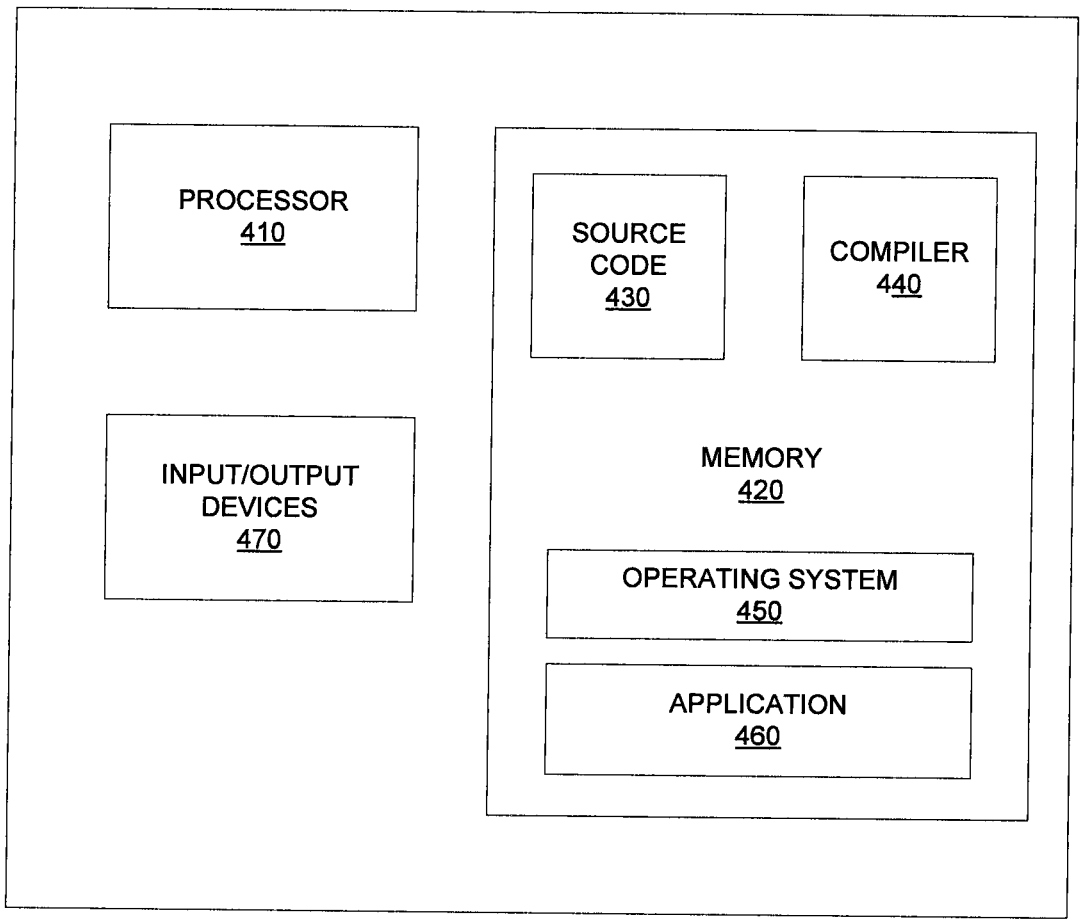
FIG. 4 illustrates an embodiment of a computer for use in conjunction with systems and methods for priority promotion for a service request.

FIG. 4 illustrates an example of a computer 400 having capabilities, which may be utilized by exemplary embodiments of systems and methods for priority promotion for service requests as embodied in software. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (OS) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the OS 450. Furthermore, the application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the OS 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the OS 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include prevention of system performance problems by regulating a number of pending service requests.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for priority promotion of a service request comprising:

receiving the service request for a target address space into a set of work requests, the set of work requests comprising a plurality of service requests for the target address space, the service request originating from a source address space, the service request having a priority equivalent to a priority of the target address space, the source address space having a higher priority than the target address space;

determining a number of service requests for the target address space in the set of work requests; and, in the event the number of service requests for the target address space exceeds a predetermined value, promoting the priority of the service request to the priority of the source address space.

2. The method of claim 1, further comprising executing work associated with the service request.

3. The method of claim 1, further comprising promoting a predetermined number of subsequently received service requests for the target address space.

4. A computer program product comprising a non-transitory computer readable medium containing computer code that, when executed by a computer, implements a method for priority promotion of a service request, the method comprising:

receiving the service request for a target address space into a set of work requests, the set of work requests comprising a plurality of service requests for the target address space, the service request originating from a source address space, the service request having a priority equivalent to a priority of the target address space, the source address space having a higher priority than the target address space;

determining a number of service requests for the target address space in the set of work requests; and, in the event the number of service requests for the target address space exceeds a predetermined value, promoting the priority of the service request to the priority of the source address space.

5. The computer program product according to claim 4, further comprising executing work associated with the service request.

6. The computer program product according to claim 4, further comprising promoting a predetermined number of subsequently received service requests for the target address space.

* * * * *